Figure 1:
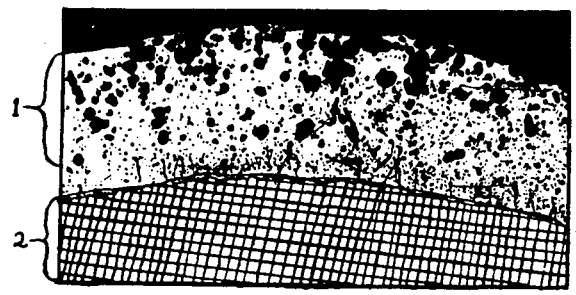

June 26, 1956    M. G. WHITFIELD ET AL    2,752,265
METHOD OF PRODUCING A POROUS METAL COAT ON A COMPOSITE
Filed July 24, 1951

INVENTOR.
BY M. G. Whitfield
V. Sheshunoff

United States Patent Office 2,752,265
Patented June 26, 1956

2,752,265

METHOD OF PRODUCING A POROUS METAL COAT ON A COMPOSITE

Marshall G. Whitfield, Garden City, and Victor Sheshunoff, Jericho, N. Y., assignors to Whitfield & Sheshunoff, Incorporated, Garden City, N. Y., a corporation of New York Application July 24, 1951, Serial No. 238,278

1 Claim. (Cl. 117—65)

This invention relates to a method for producing such surfaces which are resistant to wear and heat.

The solution of the problem of how to produce a heat and wear resistant aluminum-iron alloy surface on iron and steel bodies has long been sought. Previous attempts to solve this problem were unsuccessful and many difficulties were encountered such as the blistering and peeling of the major part of the aluminum-iron alloy away from the steel body, or the weakening of the inter-metallic bond between the steel base and the aluminum-iron surface alloy to an extent that failure often resulted. When failures of this kind occur, the remaining steel base breaks down rapidly.

The present invention overcomes these and other difficulties and provides an adherent porous aluminum-iron alloy surface on steel bodies which has a minute or sub-visual porous structure remarkably well adapted to hold fluids such as lubricants in the pores thereof. The porous aluminum-iron surfaces of this invention are not subject to failure through peeling even upon repeated cycles of heating and cooling, and the porous structure persists in spite of such cyclic heating and cooling.

Accordingly, it is an object of this invention to provide firmly adherent and uniformly porous aluminum-iron alloy surfaces on iron or steel bodies, such surfaces being durable and resistant to wear and heat.

In general, the porous alloy surfaces of this invention are produced on iron or steel articles by dipping or otherwise coating such articles with molten aluminum and developing an iron-aluminum alloy in situ on the surface of the article by quickly heating the latter to an elevated temperature. The porous surface structure is produced during such rapid heating and it is substantially uniform in exent and depth as well as being extremely adherent and resistant to wear. While we do not wish to be limited by any theory as to the mechanism by which such surface is formed, we believe that gas dissolved in the aluminum is released in the form of minute bubbles during heating simultaneously with the formation of the complex iron-aluminum alloy. We have noted that if the degree of heating is insufficient, the gas in the aluminum is trapped as a layer or line of minute bubbles adjacent to the iron-aluminum bonding layer and a weak, brittle structure results at this zone. On the other hand, if heating is properly effected, the gas tends to disperse uniformly through the outer layers of alloy forming from the iron and the aluminum during the heating period, and the gas bubbles produce the desired porous structure in the outer surface of the alloy. However, the inter-alloying bond between the ferrous article and the aluminum formed at the time of coating is solid and substantially free from porosity.

Aluminum absorbs gas rather readily when maintained in a molten condition at temperatures of 1400–1500° F. or higher. Molten aluminum for use in this invention may absorb gas in this manner or gas may be permitted to enter aluminum being held at a somewhat lower temperature as by introducing a metal strip which is at a high temperature, 1400–1600° F., or higher, directly from a bright annealing furnace into a bath of molten aluminum. We have found that when iron or steel articles are dipped or otherwise coated with such gas-containing, molten aluminum and treated to develop an iron-aluminum alloy which extends from the interface to the surface of the article, the gas is released and a porous structure is developed in the surface alloy layer. The alloy surfaces of this invention are porous when viewed under the microscope and comprise innumerable, small, round holes in a matrix of alloy composed largely of iron and aluminum. When this surface is ground and polished, some of the minute holes are exposed and a uniformly discontinuous surface results.

The porous surfaced articles produced by this invention are remarkably well suited for use as surfaces of the so-called intermittent lubricated type. The small pockets or pores act as individual reservoirs for oil and other lubricants differing in kind from the electrolytically produced "porous chrome" surfaces which are reported to be a series of irregular, connected surface chanels. Likewise, it is different in kind from mechanically grooved surfaces which, of necessity, are also connected and continuous.

In the drawings, Fig. 1 is a photomicrograph showing a preferred form of our invention. The structure shown was obtained by dipping a medium carbon steel specimen having a diameter of ⅛" into molten aluminum maintained at approximately 1400° F. to form a coating having a thickness of from 4–6 mils. The specimen was immersed in molten metal for a period of about four minutes, removed to a muffle furnace maintained at a temperature of approximately 1900° F. and allowed to remain therein for thirty-five minutes. It will be noted that random porosity was secured throughout the full depth of the outer iron-aluminum alloy layer 1, and there is no zone of weakness between this alloy layer and the base steel 2.

Figure 2:

Fig. 2 is a photomicrograph of an undesirable and weak type of structure which is outside the scope of this invention. This structure was obtained by passing a low carbon steel strip having a thickness of 14 mils through a bright annealing furnace and then into a bath of molten aluminum. An aluminum coating having a thickness of about 2 mils was deposited on the strip, the coated strip was allowed to cool to room temperature and then electrically heated by resistance to a temperature of about 1400° F. The resulting outer alloy layer 3 is separated from the base by a series of gas holes 4 in a substantially straight line adjacent to the initial alloy bond formed during the coating operation by the action between the molten aluminum and the base steel 5. A few occasional pores appear in the outer iron-aluminum alloy layer but the concentration of pores 4 accurately illustrates the condition which we find is conducive to scaling or peeling and must be avoided. Failure in the alloy layer usually occurs through this concentrated zone of gas holes, leaving the steel base deficient in alloy protection and with a low grade of oxidation resistance subject to complete breakdown.

Figure 3:
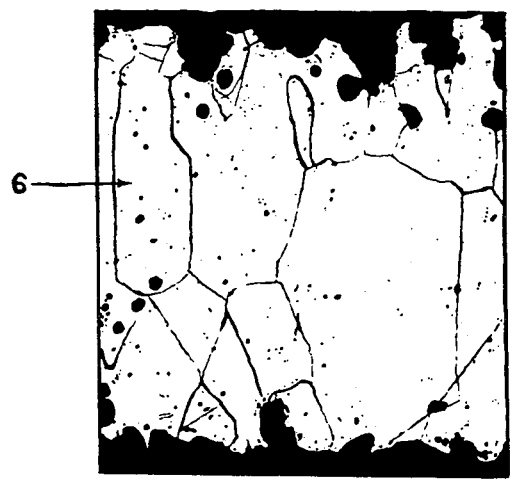

Fig. 3 shows a section through a sample of low carbon steel strip having a thickness of 12 mils coated in a manner identical to the sample shown in Fig. 2. However, it was electrically heated by resistance to a temperature of 2282° F. for 10 hours. The aluminum coating has been alloyed completely through the base steel so as to create a large grain size 6 with random porosity shown throughout.

Suitable conventional polishing procedures may be used to finish articles treated by our process to grind off the surface oxide and to smooth the surfaces. For symmetrical articles such as rounds or flats, conventional grinding and honing machines may be used. With irregular shaped objects such as stove grates or articles made of sheet or wire, the submerged abrasive polishing mill or barrel may be used. Aloxite pebbles in a soap solution in such equipment brings out any degree of polish desired on the treated article.

This invention is not limited to the production of the specific surfaces described above and is well suited for use in the manufacture of articles for high temperature applications such as stove grates, valves, cylinder liners for internal combustion engines, gas turbine blading and ram-jet parts.

The process of this invention provides a product different in kind from that obtained by earlier workers. In one case, Keep, Patent No. 1,456,274 using a lower temperature coating bath and fluxing for dip coating, obtained a non-porous surface which is stated to be inherent in the use of his process. The calorizing process disclosed by Sayles, Patent No. 1,988,277 and Howe, Patent No. 1,899,569 produce a non-porous iron-aluminum alloy of high melting point directly on the surface of the ferrous article and they teach that aluminum diffuses through this alloy into the iron progressively from the surface without developing porosity in any of the treated areas. In our findings, using hot dip coatings of aluminum containing dissolved gases, the original iron-aluminum alloy bond zone formed on the surface of the iron in the coating operation apparently acts somewhat as a barrier or screen to the gases contained in the aluminum coating as interdiffusion of the aluminum and iron occurs, thus resulting in a discontinuous line of gas holes or pockets as shown in Fig. 2. Although the iron will diffuse into the outer layer of the aluminum coating at lower temperatures than we claim as critical, the line of gas holes which results constitutes a zone of weakness and a region where peeling originates.

We have found that it is critical to the success of this invention to heat the coated article rapidly to a temperature of at least 1700° F. and preferably higher at which temperature diffusion of iron and aluminum occurs simultaneously with additional gas absorption by the molten aluminum layers and liberation of gases dissolved earlier to create a uniform degree of porosity in the alloy structure being formed by the diffusion. It is our finding that articles with the uniform porosity in the outer alloy layers, as shown in Fig. 1, do not scale or peel off whereas substantially nonporous surface layers, underlaid by a concentrated zone of gas holes as shown in Fig. 2, are subject to failure.

The rate at which the articles heat up depends upon the heating means employed, and in the case of convection or radiation upon the heat head established. We have obtained excellent results by subjecting aluminum-coated steel strip, small articles, such as internal combustion engine valves, cylinder liners, and stove grates under the following conditions:

1. Induction—minute or less
2. Electric resistance—not over 5 minutes
3. Convection or radiation—major action is accomplished in a matter of minutes. Furnace temperature is maintained several hundred degrees above the optimum diffusion temperature.

The use of a reducing atmosphere in the furnace tends to help in obtaining maximum utilization of aluminum for alloying purposes, but it is not essential to the diffusion operation. The coated material is allowed to remain in the furnace until the desired degree of diffusion is obtained, in some instances extending through the entire thickness of the steel, for instance as shown in Fig. 3. Diffusion may be carried out partly or completely through the steel and the depth of diffusion depends upon the thickness of the initial aluminum layer and the duration of heating. If the steel is only partially impregnated with aluminum, i. e., the depth of diffusion does not extend the full way through the steel, but leaves a core or layer of material of initial composition; it appears that such partially impregnated steel may have many important advantages, particularly for use in high frequency applications, or applications requiring a high degree of oxidation resistance at elevated temperatures. Diffusion of the aluminum layer may be partially effected to produce a steel having an aluminum-iron alloy layer adjacent to its surface covered by a layer of aluminum oxide. An outer layer of aluminum oxide possesses the advantage of providing an electrical insulating layer on the steel body. Depending on the nature of the atmosphere in the furnace, the steel article may be provided with a desired oxide coating, i. e., a reducing atmosphere produces a somewhat lighter oxide layer than a neutral or slightly oxidizing atmosphere.

Heretofore, articles made of iron-aluminum alloys containing more than about 5% of aluminum were very difficult to work because of their inherent brittleness. However, by the process of this invention, all working or shaping operations are easily effected on the initially coated steel and then, after the desired degree of working or shaping is accomplished, the worked article is subjected to a heating operation to diffuse the aluminum into the steel. The ease of working an aluminum coated steel differs essentially from the difficult and sometimes impossible working conditions encountered in working aluminum-iron alloys. After complete diffusion, the aluminum appears to be in the form of a true solution in the iron and resembles in all respects the electrical and physical properties of a true aluminum-iron alloy. However, aluminum-iron alloys containing up to 12% or more have been successfully formed in a steel body by the process of this invention.

Lower grades of silicon steel unsuited for use as transformer stock may be subjected, in accordance with this invention, to an aluminum coating and diffusion process and thereby be made entirely suitable for use as transformer steel. Other alloying ingredients commonly found in low alloy steels may be used with silicon, or may replace the silicon in part or entirely.

By using aluminum alloys it is possible to produce special transformer sheets cheaply. Combinations of elements with aluminum in unusual compositions may be successfully used to produce transformer sheets which would be virtually impossible to produce by customary methods.

Resistor alloys for electrical furnace elements may also be coated with aluminum or an alloy thereof and thereafter subjected to a diffusion treatment to form a solution of the aluminum or aluminum alloy therein. The porosity will act to increase the resistance of a given cross-section.

The invention will be more particularly described, but not in a limiting sense, in connection with the following examples:

1. Stove grates

A low carbon steel grate stamped from 0.045" enameling grade sheet stock was dip coated with molten aluminum so as to develop an alloy bonded coating of 0.004–0.007" thickness per side. It was cooled down to room temperature, then placed in a gas fired muffle furnace at a temperature of about 1800° F., where it was brought up to this temperature in approximately 5 minutes and allowed to remain in the furnace for 1–2 hours. After removing and cooling down to room temperature, it was tumbled in a submerged abrasive polishing barrel to produce a finely polished, yet highly porous surface.

2. Strip and sheet steel

A strip of commercially pure iron (Armco Iron or equivalent) 0.010" thick is coated in a continuous coating unit of the type described in Patent No. 2,166,510 or 2,401,375 so as to create an alloy bonded aluminum coating approximately 0.002" thick. The coated strip is passed directly from the coating unit to a muffle furnace to raise the temperature of the coated strip to approximately 1825° F. during the first minute in either air or a bright annealing atmosphere and held at this temperature for approximately 1 hour. The aluminum diffused completely through the strip, forming what appears to be a solid solution of aluminum in iron. Continued heating of the strip increased the grain growth to an extent that some of the grains became very large. Following the heat treating operation, the strip may be polished in a submerged abrasive polishing barrel or it may be used with the oxide layer in place for electrical application requiring an insulating layer over the surface.

3. Strip steel

A strip of low carbon steel having a thickness of 0.059" was coated with aluminum by a conventional hot dipping process to obtain a coating of aluminum 0.003" thick on both sides. This coated strip was cooled down to room temperature and then heated by electric resistance under oxidizing conditions to a temperature of 2282° F. for a period not exceeding 3 minutes. Upon cooling down to room temperature, it was found to have a slate gray appearance with oxide over the surface. Repeated reheating to temperatures ranging from 1000° F. to 2200° F. revealed no scaling or peeling of a surface layer which would cause the steel to quickly fail through oxidation.

4. Resistor wire

A chrome iron wire having a diameter of about 0.015" was coated with aluminum by a conventional hot dipping process such as Patent No. 2,166,510 to a thickness of 0.001", all over. This coated wire was passed into a chamber having a reducing atmosphere and resistance heated therein to a temperature of about 2300° F. for a time of 2 minutes. The wire, when cooled to room temperature, had a dark gray smooth appearance and under the microscope appeared similar to a chromium-iron-aluminum alloy. It is suitable for use as a high temperature heating element for a furnace.

5. Cylinder liner

An engine cylinder liner 5¾" I. D. and 6 9/16" O. D. of S. A. E. 4140 steel, ground on the I. D. to provide a smooth, accurate contour, was coated in a bath of commercially purity aluminum for 5 minutes at approximately 1400° F. to give a .004–.007" aluminum coating. It was then placed in a heat treating furnace maintained at a temperature of about 1800° F., where it was rapidly heated to temperature and soaked for approximately 1 hour, cooled down to 1600° F. and quenched in oil. After tempering at 1100–1200° F., the inside diameter is ground and honed to remove the surface oxide, leaving a finely porous surface, gun metal in color, with subvisual porosity, and a hardness of the alloy layer of approximately 50 Rockwell C.

We claim:

In the art of producing an aluminum coating on the surface of a ferrous base metal wherein the aluminum coating is bonded to said article by an intermediate layer of an aluminum-iron alloy and a line of dissolved gases is formed in said aluminum coating close to said base metal and remote from the free surface of said coating, the improvement of controlling and producing a uniform degree of porosity in the free surface of said aluminum coating for receivably absorbing and retaining a lubricant therein without affecting the bonding strength of said intermediate layer, said improvement comprising dipping said ferrous article into a bath of gas-occluded aluminum for a sufficient time to produce said intermediate layer of a thickness between 2 and 7 mils, and heat treating said coated base metal at a temperature between 1700° F. and 1900° F. for a period between 35 minutes and 2 hours whereby the line of dissolved gases migrates to and produces a uniform degree of porosity in the free surface of said coating.

References Cited in the file of this patent

UNITED STATES PATENTS

| | | |
|---|---|---|
| 1,409,017 | Ortiz | Mar. 7, 1922 |
| 1,655,269 | Howe | Jan. 3, 1928 |
| 1,823,869 | Baur | Sept. 15, 1931 |
| 1,877,569 | Falkenthal | Sept. 13, 1932 |
| 1,881,064 | Sayles | Oct. 4, 1932 |
| 1,982,563 | Wimmer | Nov. 27, 1934 |
| 1,988,217 | Sayles | Jan. 15, 1935 |
| 2,082,622 | Fink | June 1, 1937 |
| 2,090,408 | Vance | Aug. 17, 1937 |
| 2,303,869 | Quinlan | Dec. 1, 1942 |
| 2,308,669 | Beed | Jan. 19, 1943 |
| 2,396,730 | Whitfield | Mar. 19, 1946 |
| 2,444,422 | Bradford | July 6, 1948 |
| 2,490,543 | Robertson | Dec. 6, 1949 |
| 2,490,548 | Schultz | Dec. 6, 1949 |